(12) United States Patent
Graham

(10) Patent No.: US 9,409,508 B2
(45) Date of Patent: Aug. 9, 2016

(54) PORTABLE AND ADJUSTABLE MOTORCYCLE WHEEL CHOCK

(71) Applicant: Adam J. Graham, Coon Valley, WI (US)

(72) Inventor: Adam J. Graham, Coon Valley, WI (US)

(*) Notice: Subject to any disclaimer, the term of this patent is extended or adjusted under 35 U.S.C. 154(b) by 0 days.

(21) Appl. No.: 14/722,530

(22) Filed: May 27, 2015

(65) Prior Publication Data
US 2015/0343938 A1 Dec. 3, 2015

Related U.S. Application Data

(60) Provisional application No. 62/005,042, filed on May 30, 2014.

(51) Int. Cl.
*B60P 7/08* (2006.01)
*B60P 3/077* (2006.01)
*B60T 3/00* (2006.01)
*B62H 3/04* (2006.01)

(52) U.S. Cl.
CPC .. *B60P 3/077* (2013.01); *B60T 3/00* (2013.01); *B62H 3/04* (2013.01)

(58) Field of Classification Search
CPC .............. B60P 3/077; B60T 3/00; B62H 3/04

USPC ......... 410/2, 3, 7–9, 18–23, 30, 49, 121, 129, 410/151; 188/32; 224/403–404; 211/20–22, 211/24
See application file for complete search history.

(56) References Cited

U.S. PATENT DOCUMENTS

| 3,912,139 | A | * | 10/1975 | Bowman | B60R 9/00 211/22 |
| 5,697,742 | A | * | 12/1997 | House | B60P 7/15 410/121 |
| 6,331,094 | B1 | * | 12/2001 | Burrows | B60P 3/077 410/3 |

* cited by examiner

*Primary Examiner* — Stephen Gordon
(74) *Attorney, Agent, or Firm* — Dunlap Bennett & Ludwig PLLC

(57) ABSTRACT

A portable and adjustable motorcycle wheel support including a wheel chock and a support post is provided. The wheel chock includes a first side member and a second side member, each extending from a base. The first side member and the second side member form a receptacle in between sized to secure a wheel within. The support post extends laterally from the wheel chock, and is formed to support the wheel chock in an upright position. The support post is extendable in length to secure the present invention in different sized truck beds and trailers.

6 Claims, 4 Drawing Sheets

PORTABLE AND ADJUSTABLE MOTORCYCLE WHEEL CHOCK

CROSS-REFERENCE TO RELATED APPLICATION

This application claims the benefit of priority of U.S. provisional application No. 62/005,042, filed May 30, 2014, the contents of which are herein incorporated by reference.

BACKGROUND OF THE INVENTION

The present invention relates to wheel chocks and, more particularly, to a portable and adjustable motorcycle wheel chock.

When hauling a motorcycle in the back of a pickup truck or trailer, the only safe way to transport it is if the front wheel is secured from sliding and moving side to side. A wheel chock is used to secure the front tire of the motorcycle. Currently, wheel chocks need to be bolted into the bed of the truck or trailer, or they slide side to side because nothing prevents the lateral (side to side) movements. This has always been an issue because all makes and models of trucks and trailers have different sized truck beds, and trailers are different widths. Most people do not want to bolt a wheel chock into the bed of their pickup truck or trailer because holes are formed through the truck bed. Further, after the chock has been installed, the truck or trailer has a limited use.

As can be seen, there is a need for a portable and adjustable motorcycle wheel chock.

SUMMARY OF THE INVENTION

In one aspect of the present invention, a portable and adjustable motorcycle wheel support comprising: a wheel chock comprising a first side member and a second side member, each extending from a base, wherein the first side member and the second side member form a receptacle in between sized to secure a wheel within; and a support post extending laterally from the wheel chock, and formed to support the wheel chock in an upright position, wherein the support post is extendable in length.

In another aspect of the present invention, a portable and adjustable motorcycle wheel support comprises: a wheel chock comprising a first side member and a second side member, each extending from a base, wherein the first side member and the second side member form a receptacle in between sized to secure a wheel within; a support post extending laterally from the wheel chock and comprising a first receiving end and a second receiving end, wherein the support post is formed to support the wheel chock in an upright position; and a first telescoping tube slidably engaged with the first receiving end, and a second telescoping tube slidably engaged with the second receiving end.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a portable, and adjustable armed motorcycle wheel chock for the bed of pickup trucks and trailers. The present invention includes adjustable arms which extend from the wheel chock to the side of the truck bed or trailer. They are then secured into position. This prevents the wheel chock from sliding side to side.

The present invention includes a wheel chock that may be many different shapes and designs. The wheel chock holds the front wheel straight. The adjustable arms extend outward from the wheel chock. Once extended to the side of the truck bed, it's locked, or secured into place. This prevents the side to side movement. The present invention may further include an additional stabilizer appendage which can help stabilize the unit for heavier motorcycles.

Figure 1:
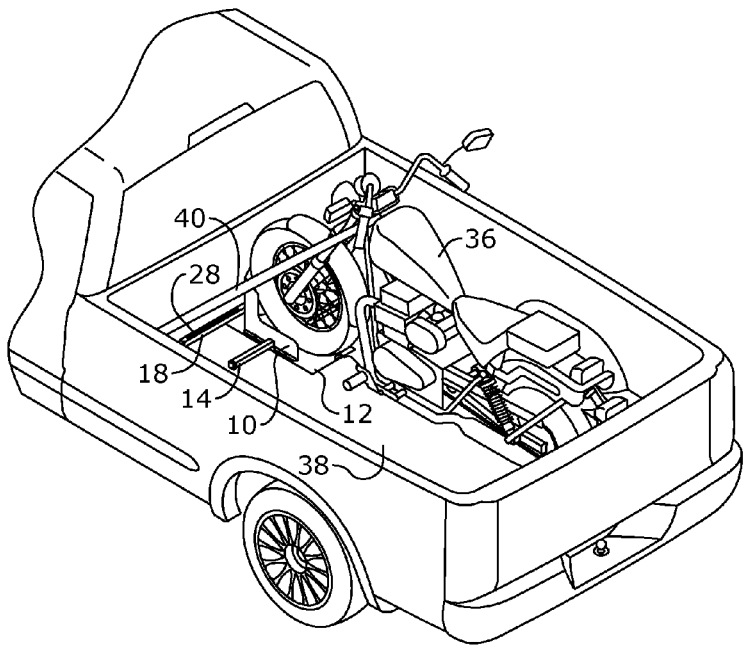
FIG. 1 is a perspective view of an embodiment of the present invention, shown in use.
Figure 2:
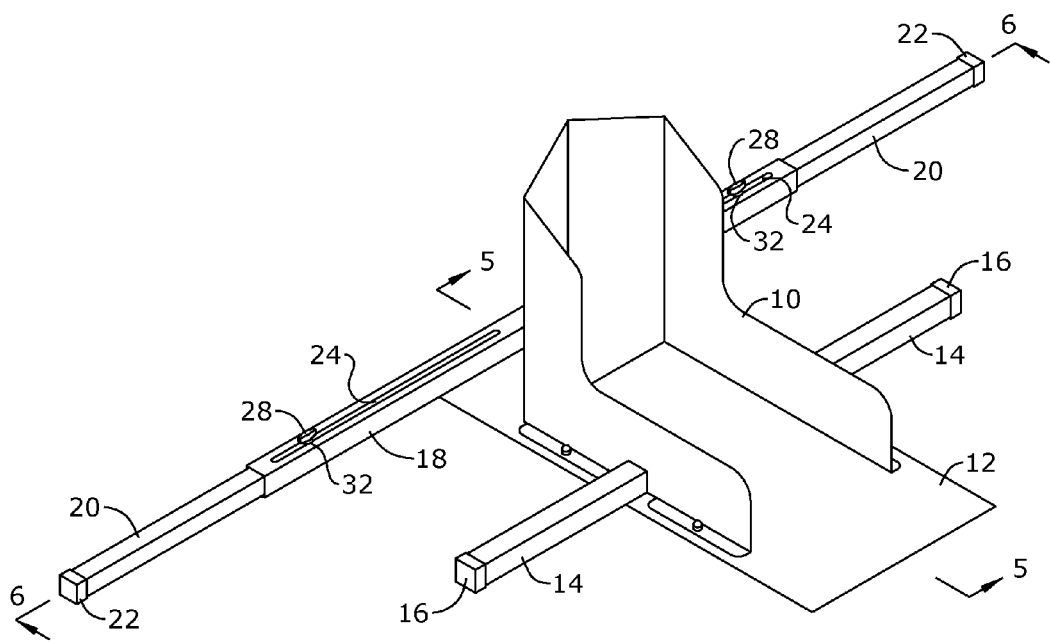
FIG. 2 is a perspective view of an embodiment of the present invention.
Figure 3:
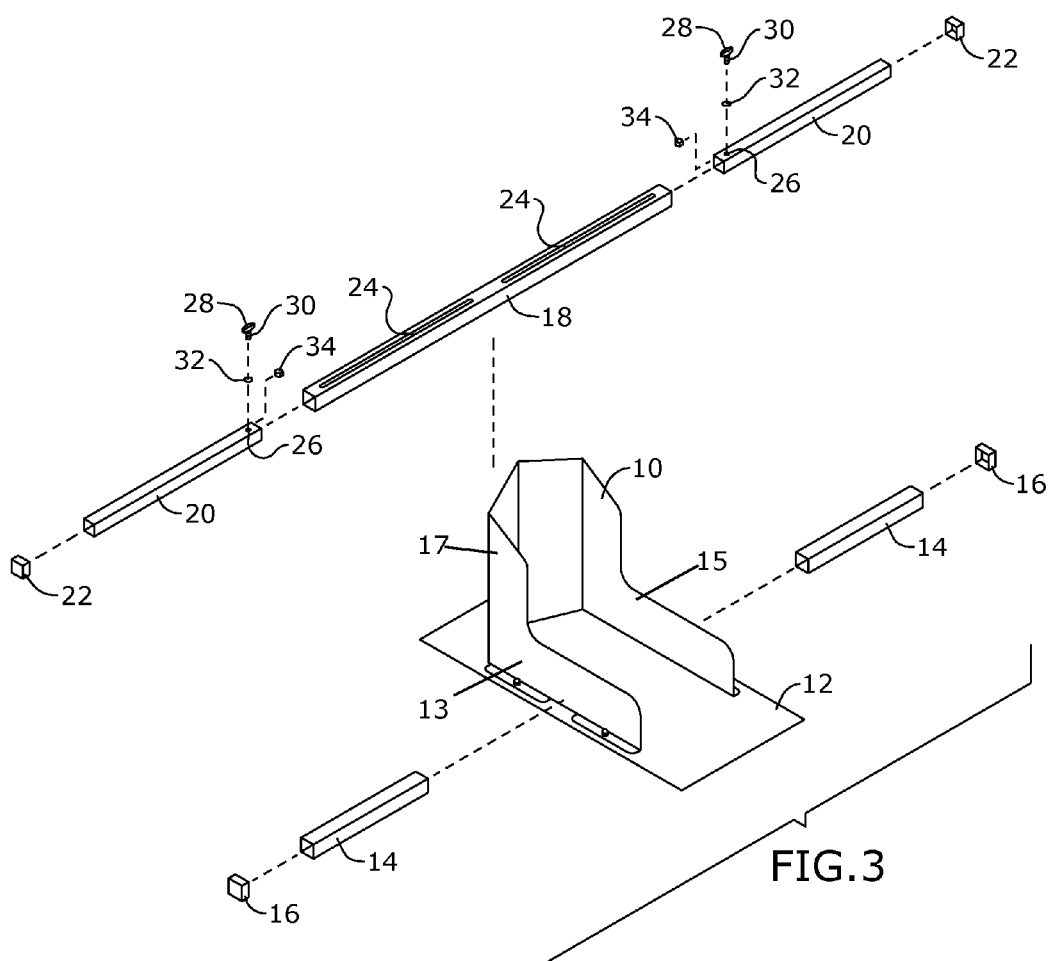
FIG. 3 is an exploded view of an embodiment of the present invention.
Figure 4:
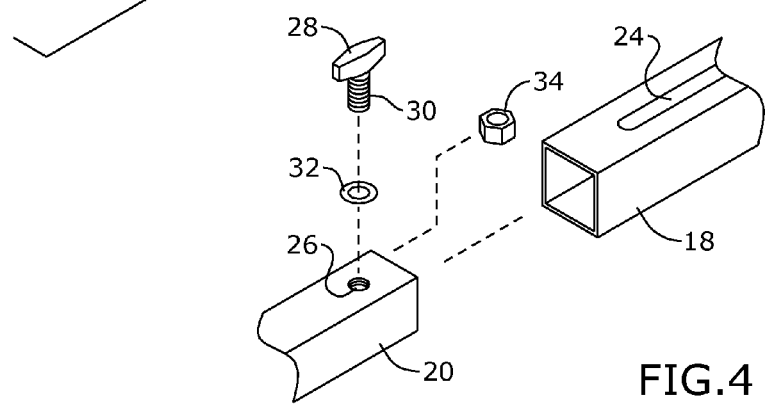
FIG. 4 is a detail exploded view of an embodiment of the present invention.
Figure 5:
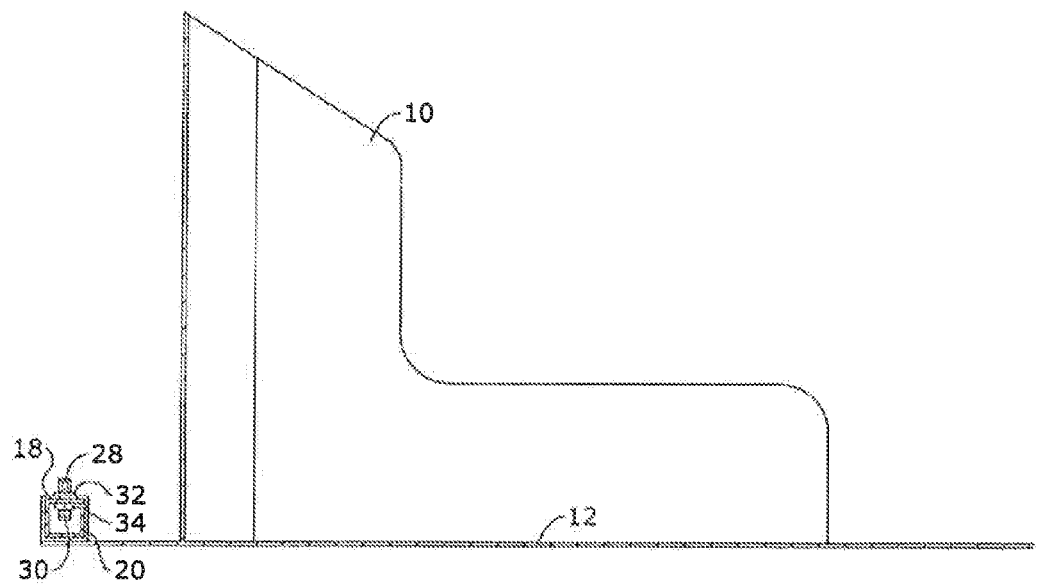
FIG. 5 is a section view of the present invention, taken along line 5-5 in FIG. 2.
Figure 6:
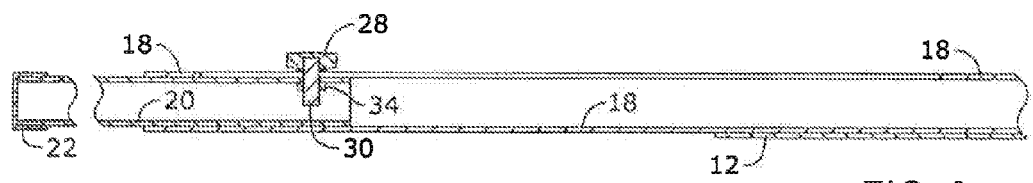
FIG. 6 is a section view of the present invention, taken along line 6-6 in FIG. 2.
Figure 7:
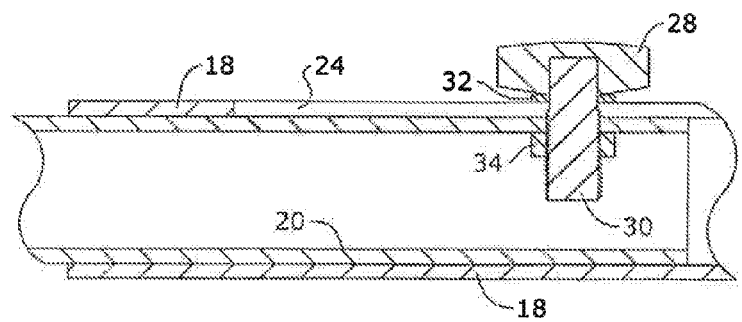
FIG. 7 is a section detail view of an embodiment of the present invention.
Figure 8:
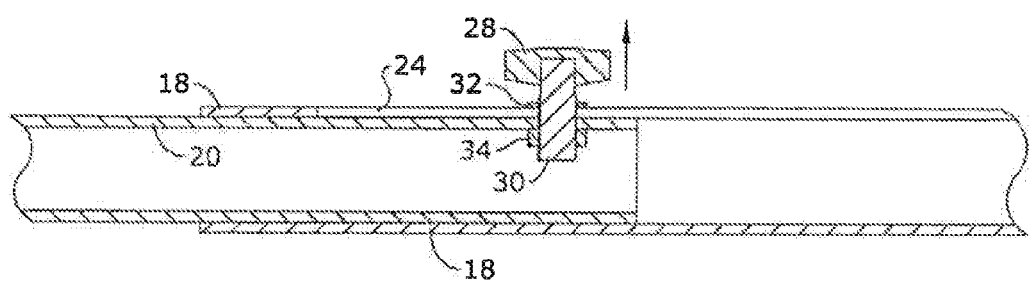
FIG. 8 is a section view of the present invention, illustrating the loosening of the knob.
Figure 9:
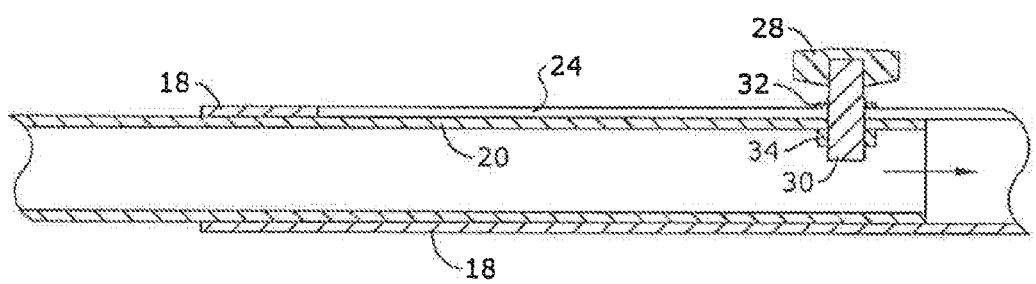
FIG. 9 is a section detail view of the present invention, illustrating the adjustment of the length of the tube.

Referring to FIGS. 1 through 9, the present invention includes a portable and adjustable motorcycle wheel support including a wheel chock 10 and a support post 18. The wheel chock 10 includes a first side member 13 and a second side member 15, each extending from a base 12. The first side member 13 and the second side member 15 form a receptacle in between sized to secure a wheel within. The support post 18 extends laterally from the wheel chock 10, and is formed to support the wheel chock in an upright position. The support post 18 is extendable in length to secure the present invention in different sized truck beds 38 and trailers.

In certain embodiments, the base 12 is a substantially flat plate, providing additional upright support to the wheel chock 10. The support post 18 is attached to the base on a first end forming a T-shape. An entrance leading into the receptacle is formed on an opposite end of the first end of the base 12. The side members 13, 15 of the wheel chock 10 may extend vertically from the base 12 and may be connected together by a back member 17. The front wheel of a motorcycle 36 may roll into the entrance and may be supported by the side members 13, 15, and the back member 17, preventing side to side movement.

The support post 18 may be adjustable in length by having telescoping members. In such embodiments, the support post 18 may include a first receiving end and a second receiving end opposite the first receiving end. A first telescoping tube 20 may fit within the support post 18 via the first receiving end, and may thereby slidably engage with the first receiving end. A second telescoping tube 20 may fit within the support post 18 via the second receiving end, and may thereby slidably engage with the second receiving end. A locking mechanism may fix the telescoping tubes 20 to the support post 18. When the locking mechanism is unlocked, the telescoping tubes 20 may slide relative to the support post 18, thereby adjusting the length of the support post 18.

In certain embodiments, the locking mechanism may include a knob having a handle 28 and a threaded bolt 30. Each of the first and second telescoping tubes 20 may include an opening 26 aligned with an elongated slot 24 formed through the support post 18. The threaded bolt 30 may fit through the aligned slot 24 and openings 26. A washer 32 may be disposed in between the handle 28 and the support post 18. A threaded nut 34 may be secured to the threaded bolt 30 so that the support post 18 and the telescoping tubes 20 are secured in between the knob handle 28 and the threaded nut 34. The knob may be tightened to fix the telescoping tube 20 to the support post 18, and loosen to allow the telescoping tube 20 to slide relative to the support post 18. Each of the telescoping tubes 20 may include rubber caps 22 to prevent scratching within the truck bed 38.

In certain embodiments, the present invention includes stabilizing posts 14. The stabilizing posts 14 may be added for supporting larger sized bikes. In such embodiments, a first stabilizing post 14 extends laterally from the first side member 13 and a second stabilizing post 14 extends laterally from the second side member 15. The stabilizing posts 14 may be in between the support post 18 and the entrance of the chock 10. The stabilizing posts 14 may be substantially shorter than the support post 18. Each of the stabilizing posts 14 may include rubber end caps 16.

A method of using the present invention may include the following. The support post 18 may be adjusted in length so that the end caps 22 of the telescoping tubes 20 are secured against the side walls of the truck bed 38. A motorcycle 36 may be positioned in the truck bed 38 so that the front wheel is secured within the chock 10. A tie down strap 40 may be used to further secure the motorcycle 36 within the truck bed 38. The support post 18 is adjustable to secure within different sized beds 38 or trailers. The chock 10 supports the front wheel, preventing the motorcycle from falling over. The present invention is used to prevent the front wheel from moving from side to side within the bed 38 or trailer.

It should be understood, of course, that the foregoing relates to exemplary embodiments of the invention and that modifications may be made without departing from the spirit and scope of the invention as set forth in the following claims.

What is claimed is:

1. A portable and adjustable motorcycle wheel support comprising:
   a base comprising a substantially flat plate having an upper surface, a lower surface opposite the upper surface, a first end, a second end opposite the first end, a first side, and a second side opposite the first side;
   a wheel chock comprising a first side member and a second side member, each extending vertically from the upper surface of the base, wherein the first side member and the second side member are spaced apart at a distance to fit a wheel in between, wherein an entrance of the wheel chock is formed at a second end of the base; and
   a support post secured to at least one of the base and the wheel chock, wherein the support post is disposed above the lower surface of the base and extends laterally beyond the first side and the second side of the base, wherein the support post is extendable in length.

2. The portable and adjustable motorcycle wheel support of claim 1, wherein the wheel chock further comprises a back member extending vertically from the upper surface of the base and attaching the first side member and the second side member together.

3. The portable and adjustable motorcycle wheel support of claim 1, wherein the support post comprises a first receiving end and a second receiving end, wherein the first receiving end is slidably engaged with a first telescoping tube, and the second receiving end is slidably engaged with a second telescoping tube.

4. The portable and adjustable motorcycle wheel support of claim 3, wherein each of the first and second telescoping tubes comprises an opening aligned with an elongated slot formed through the support post, wherein a knob is sized to fit through the respective aligned opening and elongated slot and is operable to tighten and fix the respective telescoping tube to the support post, and loosen to allow the respective telescoping tube to slide relative to the support post.

5. The portable and adjustable motorcycle wheel support of claim 1, wherein the support post is attached to the upper surface of the base near the first end.

6. The portable and adjustable motorcycle wheel support of claim 1, further comprising a first stabilizing post extending laterally from the first side member and a second stabilizing post extending laterally from the second side member.

* * * * *